Patented Mar. 6, 1923.

1,447,930

UNITED STATES PATENT OFFICE.

SAMUEL CLELAND DAVIDSON, DECEASED, LATE OF BELFAST, IRELAND, BY FREDERICK GEORGE MAGUIRE, OF BANGOR, IRELAND, ALFRED AGAR, OF HOLYWOOD, IRELAND, AND HUGH TAYLOR COULTER, OF BELFAST, IRELAND, EXECUTORS.

PREPARATION OF PRESERVATIVE SUBSTANCES FOR RUBBER LATEX.

No Drawing.  Application filed January 10, 1922. Serial No. 528,344.

*To all whom it may concern:*

Be it known that Sir SAMUEL CLELAND DAVIDSON, K. B. E., deceased, late of Sirocco Engineering Works, Belfast, Ireland, a subject of the King of Great Britain and Ireland, did invent certain new and useful Improvements in or Relating to the Preparation of Preservative Substances for Rubber Latex, of which the following is a specification.

This invention relates to the preparation of preservative substances suitable for the preservative treatment of rubber latex.

In connection with this subject Patents Nos. 1,145,352 and 1,146,851 have already been granted to the said SAMUEL CLELAND DAVIDSON relating to an effective and successful preservative for the treatment of rubber latex when freshly tapped from the rubber growing trees, the said treatment being designed to preserve the latex in its original fluid condition and free from mould and decomposition for an indefinite length of time. The said patents are hereinafter referred to as the previous patents.

According to the previous patents the preservative substances therein referred to are provided in fluid form and generically described as alkalized phenol. But an important disadvantage in the commercial employment of same has been found to consist in the fact that is has to be transported in fluid-tight metal drums the cost of which together with freight charges thereon unduly enhanced the cost of obtaining it at the rubber estates.

Now the herein described invention consists in the provision of an equally effective alkalized phenol preservative in a solid and concentrated form which can be more conveniently and cheaply transported to the rubber growing estates packed in wooden boxes, preferably lead-lined, similarly, for example to the lead-lined chests in which tea is transported to the market from the tea growing estates.

In carrying the invention into effect we usually mix 2 parts by weight of phenol crystals with 1 part by weight of caustic soda in solid form. These ingredients are mixed or ground together in a warmed receptacle for a few minutes during which time the mixture, under the influence of the intimate contact thus brought about, firstly becomes semi-fluid but gradually assumes the condition of a fine white powder. This powder can then be pressed into solid blocks of any suitable size or shape, and so long as these blocks are not freely exposed to atmospheric action they will remain in their original shape and condition for an indefinite length of time. The degree of pressure may be varied, but it has been found that for making blocks of about one pound weight a pressure of from one to two tons per square inch gives satisfactory results.

In order to protect the blocks from atmospheric action during transport and storage they are preferably encased with a tin or lead foil or other suitable wrapping and packed for transport in lead-lined wooden boxes of suitable size for convenient transport to the rubber growing estates where the blocks only require to be dissolved in the requisite amount of water to constitute an aqueous solution of about 3 to 5% strength prior to the addition of same to the latex.

We do not limit ourselves to the above mentioned relative proportions of the ingredients employed nor to the strength of the aqueous solution above referred to as these may be somewhat varied for any special reasons or requirements.

What we claim and desire to secure by Letters Patent is:—

1. The process of manufacture of an alkalized phenol preservative in a solid form for application in the form of an aqueous solution to freshly tapped rubber latex, which consists in mixing phenol crystals with caustic soda, grinding the ingredients together until a fine white powder is obtained, and pressing the said powder into blocks.

2. The process of manufacture of an alkalized phenol preservative in a solid form for application in the form of an aqueous solution to freshly tapped rubber latex, which consists in mixing phenol crystals with caustic soda, grinding the ingredients together in a warmed receptacle until a fine white powder is obtained, and pressing the said powder into blocks.

3. The process of manufacture of an alkalized phenol preservative in a solid form for application in the form of an aqueous solution to freshly tapped rubber latex, which consists in mixing phenol crystals with caustic soda, and grinding the ingredients together until a fine white powder is obtained.

4. The process of manufacture of an alkalized phenol preservative in a solid form for application in the form of an aqueous solution to freshly tapped rubber latex, which consists in mixing phenol crystals with caustic soda, and grinding the ingredients together in a warmed receptacle until a fine white powder is obtained.

5. The concentrated alkalized phenol preservative in the form of solid blocks containing a mixture of phenol crystals with caustic soda.

6. The concentrated alkalized phenol preservative in the form of a powder containing a mixture of phenol crystals with caustic soda.

In testimony whereof we have signed our names to this specification.

FREDERICK GEORGE MAGUIRE.
ALFRED AGAR.
HUGH TAYLOR COULTER.

*Executors of Samuel Cleland Davidson, deceased.*